United States Patent [19]

Hassell

[11] Patent Number: 5,209,628

[45] Date of Patent: May 11, 1993

[54] SELF-LOADING DOLLY MOUNT APPARATUS

[76] Inventor: Curtis C. Hassell, 791 Highway 238, Jacksonville, Oreg. 97530

[21] Appl. No.: 756,696

[22] Filed: Sep. 9, 1991

[51] Int. Cl.$^5$ .............................................. B60R 9/00
[52] U.S. Cl. .............................. 414/462; 224/42.45 R; 224/282; 414/556; 414/743; 414/913; 414/917
[58] Field of Search ............... 224/42.21, 42.28, 42.32, 224/42.44, 42.45 R, 280, 282; 414/462, 463, 466, 546, 555, 556, 557, 563, 913, 917, 743

[56] References Cited

U.S. PATENT DOCUMENTS

| | | | |
|---|---|---|---|
| 3,057,491 | 10/1962 | Schlensker | 414/557 |
| 4,021,070 | 5/1977 | Shea | 414/466 X |
| 4,355,746 | 10/1982 | Casady | 224/42.45 R |
| 4,685,860 | 8/1987 | McFarland | 414/462 X |
| 4,778,333 | 10/1988 | Youmans et al. | 414/563 |
| 4,780,044 | 10/1988 | Elskamp | 414/917 X |
| 4,787,809 | 11/1989 | Zrostlik | 414/917 X |
| 4,808,056 | 2/1989 | Oshima | 414/556 X |
| 4,840,534 | 6/1989 | Totty | 414/563 |
| 4,946,182 | 8/1990 | Weber | 280/402 |
| 4,948,327 | 8/1990 | Crupi, Jr. | 414/563 |

Primary Examiner—Michael S. Huppert
Assistant Examiner—Janice Krizek
Attorney, Agent, or Firm—Henderson & Sturm

[57] ABSTRACT

An apparatus for stowing and extending for removal a towing dolly used for towing automotive vehicles. The apparatus is formed from a generally vertical support stand which is secured to the bed of a towing vehicle. Pivotally connected to the support stand is a first arm having a range of motion extending from a near vertical storage position to a near horizontal load/unload position. Pivotally attached to the first arm is a second arm which is in a near vertical position during loading and remains in a near vertical position as the first arm is pivoted into the storage position, such that the two arms are now nearly parallel. This relationship is maintained by a gas spring pivotally connected to the support stand and the second arm such that the gas spring maintains a generally parallel configuration with the first arm. A dolly mount is attached to the end of the second arm for releasably securing a towing dolly to the vertical arm. A second embodiment is disclosed whereby a pair of generally parallel, vertically disposed arms are pivotally connected in a spaced apart relation between the support stand and the dolly mount to form a parallelogram linkage. A gas spring is pivotally connected between the support stand and the dolly mount for controlling pivotal rotation of the arms whereby an operator may quickly load and unload a towing dolly from the apparatus.

6 Claims, 5 Drawing Sheets

SELF-LOADING DOLLY MOUNT APPARATUS

Technical Field

This invention relates to mounting devices, and more particularly to mounting devices having spring loaded extendable linkages. Specifically, the present invention provides a novel apparatus designed to reduce the effort involved in loading and unloading a towing dolly from a towing vehicle.

BACKGROUND ART

When a motor vehicle becomes disabled due to an accident or mechanical failure it is often necessary to tow the disabled vehicle to a repair facility. Likewise, it is often necessary to tow vehicles of parking violators to vehicle detention lots. In all of these cases, dollies are sometimes used in order to prevent damage to vehicles being towed.

In a towing operation, a pair of towing dollies are placed on opposite sides and under the vehicle to be towed. Dollies allow a vehicle to be safely towed where rotation of a vehicle's wheels is impractical or impossible due to possible vehicular damage or the like.

Towing dollies are heavy and cumbersome. These characteristics make dollies difficult to load and unload onto or from a towing truck bed. The prior art teaches the use of a pair of storage brackets mounted onto either side of a conventional towing vehicle truck bed. In practice, a towing truck operator is required to climb on top of the truck bed, lift a dolly from its bracket, and then climb down out of the bed carrying the heavy dolly. After placing the dolly in position, the operator must then climb back into the bed to carry the remaining dolly down out of the bed as described before.

The reverse of the before described operation is required in order to return the dollies to their storage brackets. Many tow truck operators have sustained back injuries and the like while handling dollies.

Those concerned with these and other problems recognize the need for a self-loading dolly mount apparatus capable of extendably securing a towing dolly over the truck bed of a conventional towing vehicle.

DISCLOSURE OF THE INVENTION

The primary object of the present invention is to provide an improved apparatus for securing towing dollies in the truck bed of a conventional towing vehicle.

Another object of the present invention is to provide a self-loading dolly mount apparatus capable of removably extending a dolly over a conventional towing truck bed to a convenient operator lifting and carrying height.

A further object of the invention is to provide a self-loading dolly mount apparatus which will minimize the risk of injury to a towing operator.

Still another object is to provide a self-loading dolly mount apparatus which is convenient and durable in operation.

A still further object of the present invention is to provide a self-loading dolly mount apparatus which is economical to manufacture and install in conventional towing truck beds.

The present invention meets these and other objectives by providing a first embodiment capable of horizontally and vertically extending a dolly from the side of a conventional tow truck bed. This is accomplished by providing a generally vertical support stand secured within the bed of a conventional tow truck. A horizontal arm is pivotally connected to the support arm such that when the arm is pivoted to a horizontal position it extends over the side of a conventional tow truck bed. A vertical arm is pivotally connected to the remaining end of the horizontal arm such that when the arm is pivoted to a vertical position, while the horizontal arm is in a horizontal position, the vertical arm extends parallel and away from the side of a conventional tow truck bed. A dolly mount bracket having a handle is pivotally connected to the remaining free end of the vertical arm for removably securing a towing dolly from a tilted position.

Also provided is a gas spring pivotally connected between the vertical support stand and the vertical arm, such that the gas spring and horizontal arm are maintained in a generally parallel spaced apart relation. In this construction a dolly may be securely stored above and over the bed of a conventional towing truck when the horizontal arm is in a vertical position extended above the vertical support stand, and while the vertical arm is in a vertical position extending from and parallel to the horizontal arm.

A dolly may be removably extended for use by grasping the handle and pulling the handle such that the horizontal arm pivots to a horizontal position and the vertical arm pivots to a vertical position. In this extended position, the vertical arm is generally perpendicular to the horizontal arm and the dolly is extended down and over the side of a conventional truck bed. The dolly mount bracket then pivots away from the vertical arm to approximately a 45° tilted position for easier loading and unloading of the dollies.

A second embodiment is also claimed and described which is capable of rotatably extending a dolly from a inventional tow truck bed. This is accomplished by providing a generally vertical support stand secured within the bed of a conventional tow truck. Securement means for securing a towing dolly is pivotally and rotatably connected to the vertical support stand by a pair of generally parallel arms pivotally connected in spaced apart relation between the generally vertical support stand and the securement means such that a parallelogram linkage is formed. Pivotally connected between the dolly securement means and vertical support stand is a gas spring for controlling pivotable rotation. A handle is also connected to the dolly securement means such that an operator may easily operate the apparatus by grasping and pulling on the handle.

BRIEF DESCRIPTION OF THE DRAWINGS

These and other attributes of the invention will become more clear upon a thorough study of the following description of the best mode for carrying out the invention, particularly when reviewed in conjunction with the drawings, wherein.

BEST MODE FOR CARRYING OUT THE INVENTION

Figure 1:
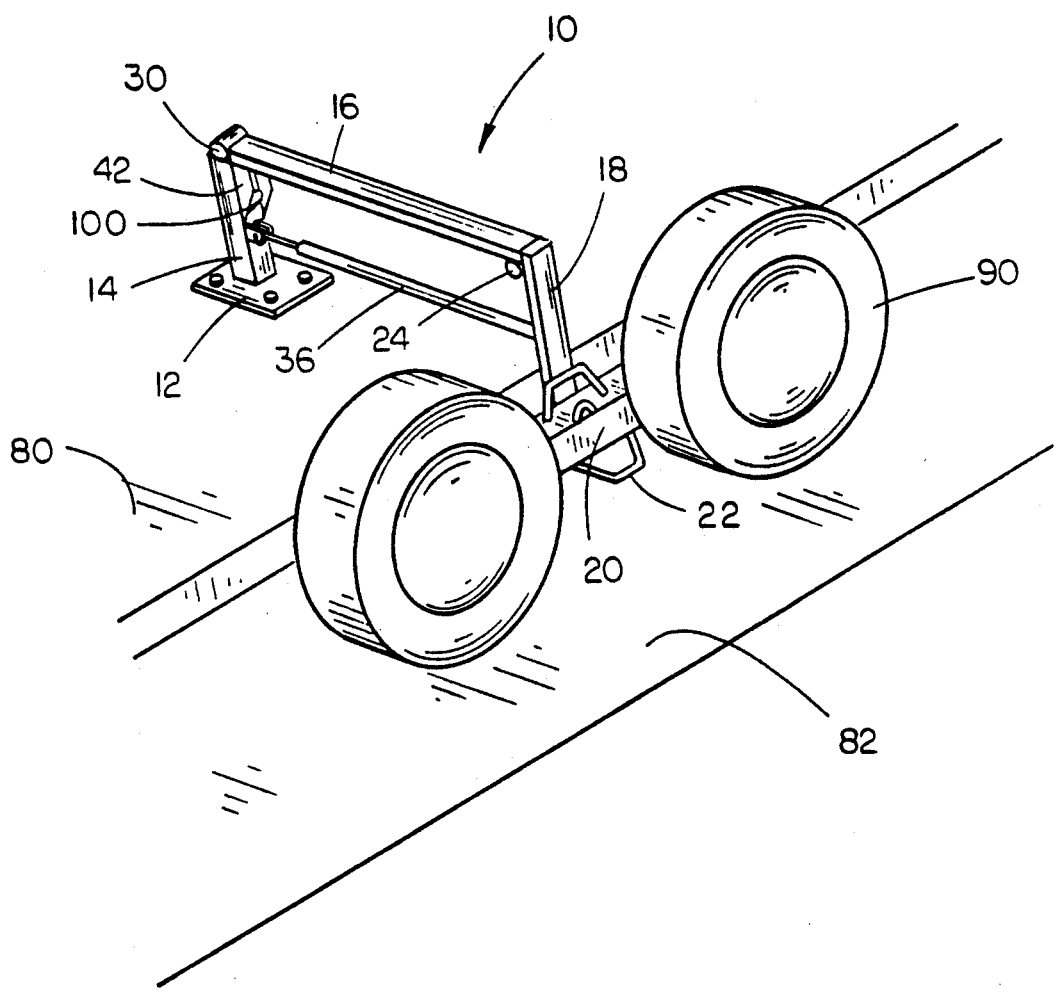
FIG. 1 is a perspective view of a first embodiment of the self-loading dolly mount apparatus showing the apparatus in a extended loading and unloading position.

Referring now to the drawings, wherein like reference numerals designate identical or corresponding parts throughout the several views, FIGS. 1 through 4 illustrate a first embodiment of the present invention 10, and FIGS. 5 through 10 illustrate a second embodiment of the present invention 50.

Turning first to FIG. 1 a first embodiment of the present invention 10 is shown in use. The apparatus 10 is illustrated in an extended loading/unloading position. As may be seen from FIG. 1 and the remaining drawings the apparatus 10 allows a towing dolly 90 to be extended from a storage position (FIG. 4) to an extended loading/unloading position (FIG. 3) by pulling the handle 22. Likewise, the apparatus 10 may be returned to a storage position by pushing the handle 22.

Figure 2:
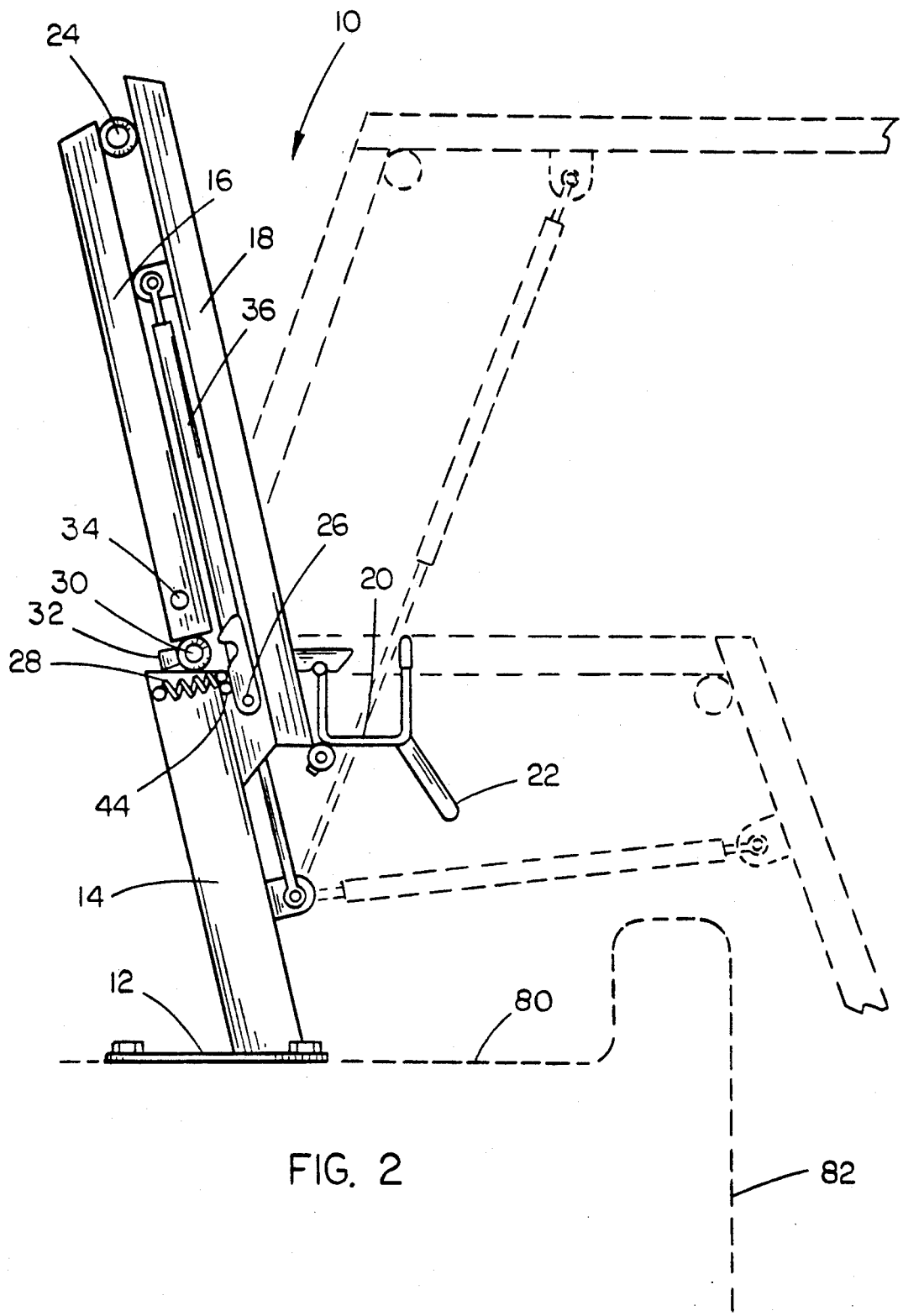
FIG. 2 is a side elevation of a first embodiment of the self-loading dolly mount apparatus showing the apparatus in a storage position, and in broken lines showing the apparatus in an extending and an extended position.
Figure 3:
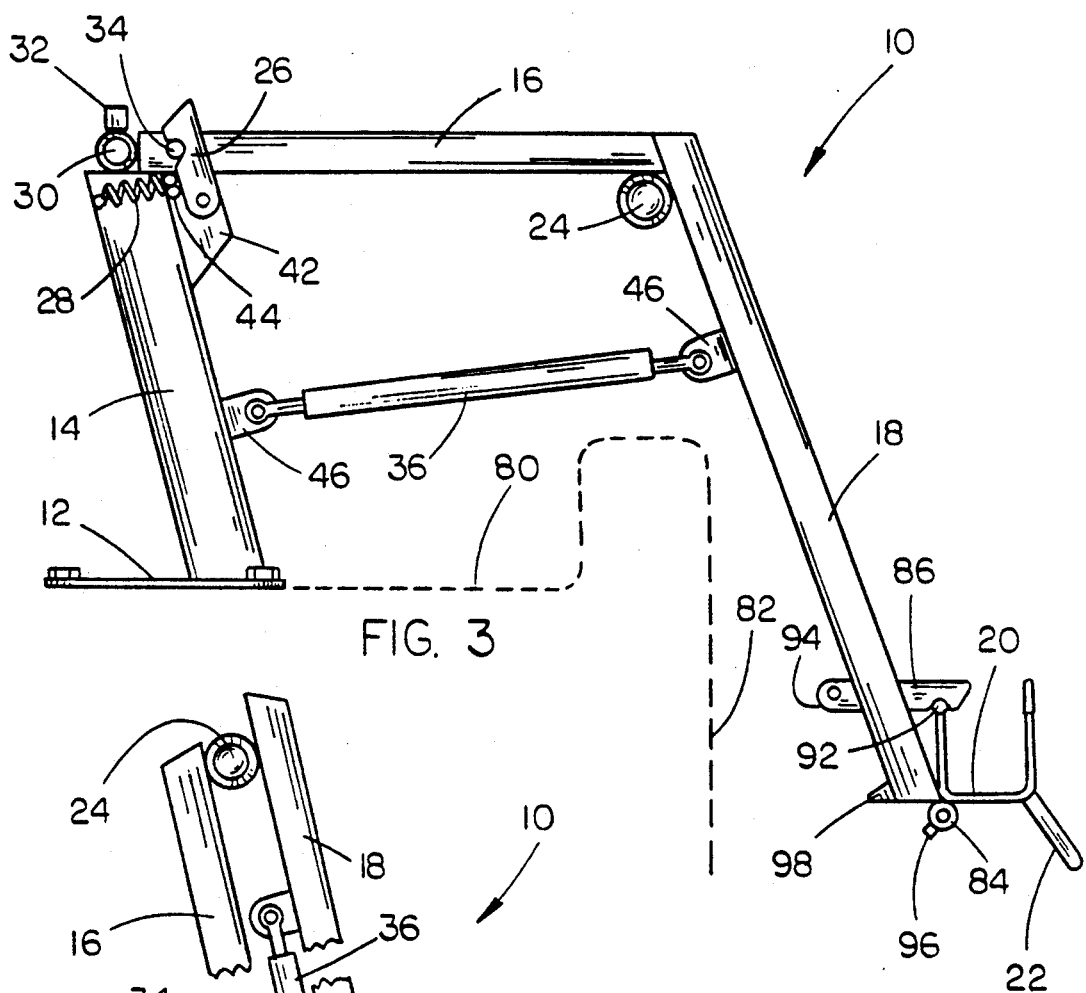
FIG. 3 is a side elevation of a first embodiment of the self-loading dolly mount apparatus showing the apparatus in an extended loading and unloading position.
Figure 4:
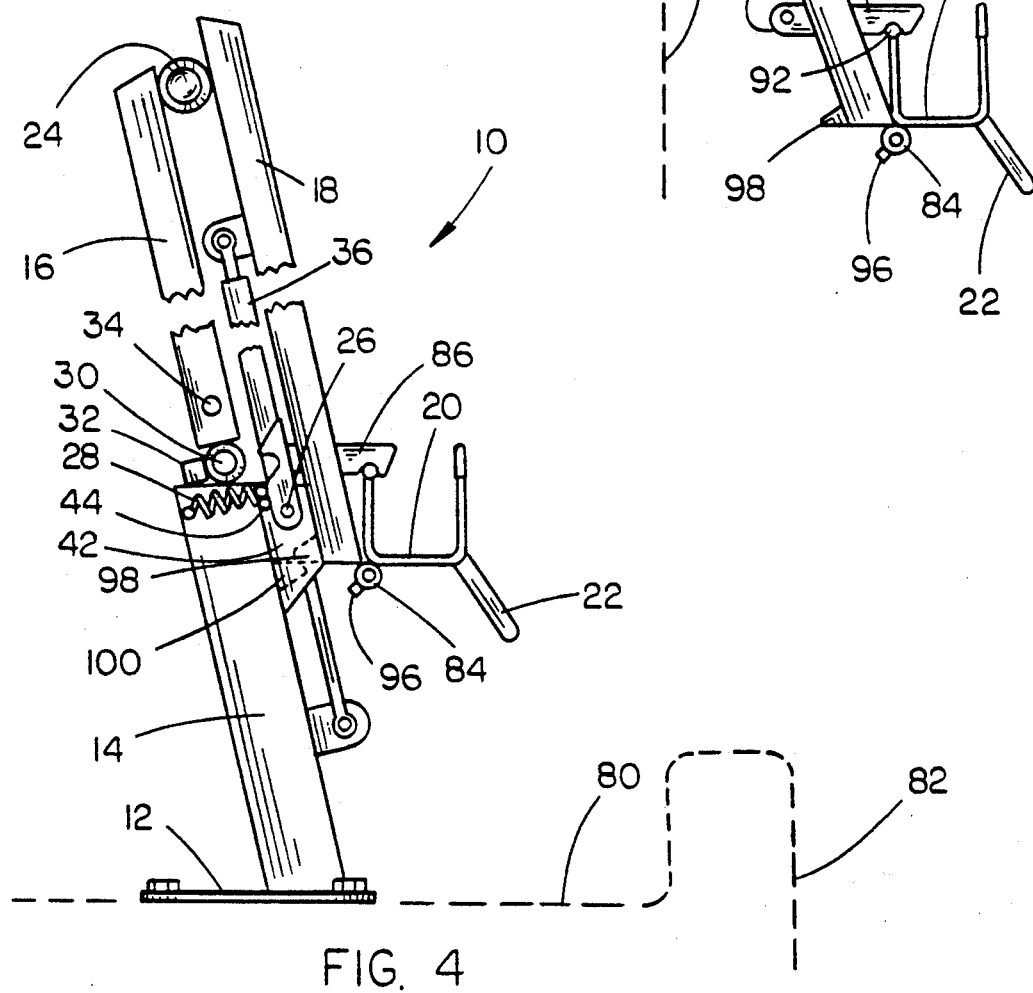
FIG. 4 is a side elevation of a first embodiment of the self-loading dolly mount apparatus showing the apparatus in a retracted storage position.

In a preferred embodiment the apparatus 10 allows the dolly 90 to be lifted from a truck bed 80, over the side of the truck bed 82, and down to an operator to a height approximately six inches below the truck bed 80 (FIGS. 1, 2, and 3).

Operation of the apparatus 10 is facilitated by a gas filled spring 36 (pressurized to approximately 170 psi). Turning now to FIG. 2, the apparatus 10 is best illustrated as including a vertical support stand 14 securely fastened to a tow truck bed 80 by a base 12. A horizontal arm 16 is pivotally connected to the stand 14 by a main hinge 30. The main hinge 30 is provided with an ar stop 32 adapted to stop pivotal movement of the horizontal arm 16.

The horizontal arm 16 is pivotally connected to a vertical arm 18 by an arm hinge 24 (FIG. 3). Operatively connected between the stand 14 and vertical arm 18 is the gas spring 36 (FIG. 3). The spring 36 is pivotally connected between the stand 14 and vertical arm 18 (in generally parallel spaced apart relation to the horizontal arm 16) via a set of mounting tabs 46.

Pivotally connected to the vertical arm 18 by a bracket hinge 84 is a dolly mounting bracket 20 adapted to removably receive a dolly 90 from a tilted position. In operation a dolly 90 may be moved from a storage position (solid lines in FIG. 2) wherein the gas spring 36 is only slightly compressed to an unloading position (second set of broken lines in FIG. 2) wherein the gas spring 36 is fully compressed and the horizontal arm 16 is resting on support gussets 42 (FIG. 3).

Figure 11:
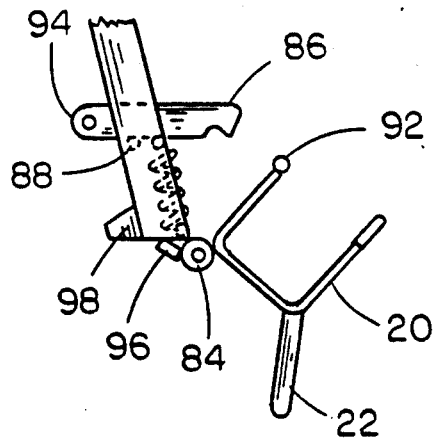
FIG. 11 is a side elevation view of a first embodiment of the self-loading dolly mount bracket in a tilted loading and unloading position.

As mentioned before, to release the dolly 90 an operator pulls on the handle 22 and the spring 36 extends and pushes the dolly 90 up and out (first set of broken lines in FIG. 2). As an operator continues to pull on the handle 22 the spring 36 moves from a fully extended position to a fully compressed position. At this point a latch spring 28 causes a latch 26 to lockably engage a latch pin 34. Once the dolly 90 is removed from the dolly mounting bracket 20 by releasing a bracket latch 86, connected to a latch-mounting tab 94, causing bracket 20 to rotate approximately 45°, an operator may then push up handle 22 to place bracket 20 back to a storage position where a latch spring 90 (broken line) causes latch 86 to lockably engage a latch pin 92 (FIG. 11). An operator may then release the latch 26 and push the apparatus 10 back into a storage position (FIG. 4), by placing the vertical arm guides 98 (FIG. 3) between support gussets 42, so that guides 98 are resting on top of inside stops 100 (broken lines) (FIG. 4), preventing a vertical descent of dolly mounting bracket.

Figure 5:
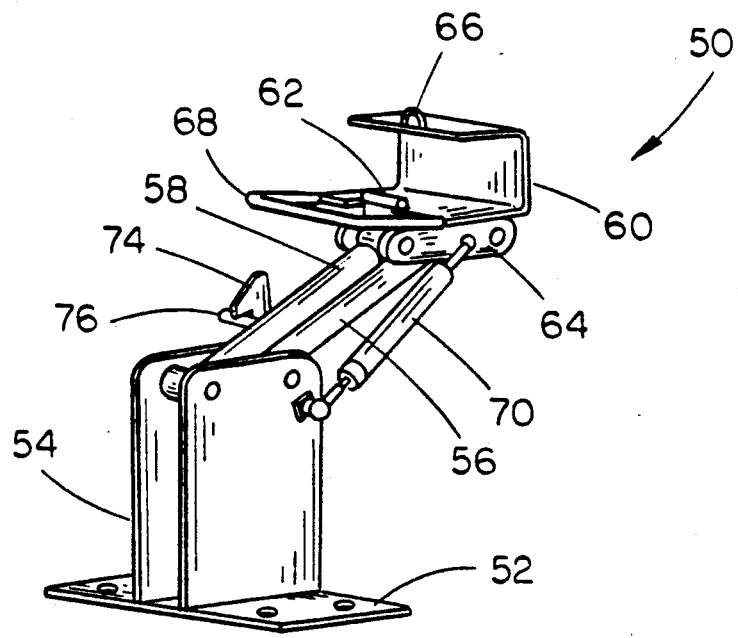
FIG. 5 is a perspective view of a second embodiment of the self-loading dolly mount apparatus showing the apparatus in a storage position.
Figure 6:
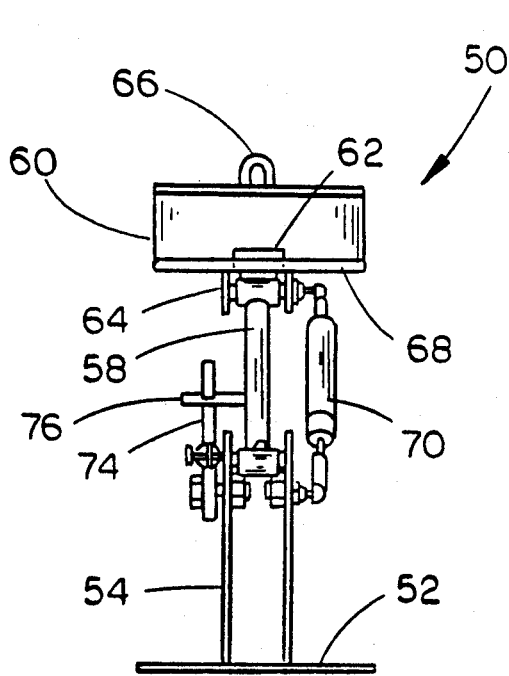
FIG. 6 is a front elevation view of a second embodiment of the self-loading dolly mount apparatus illustrating the components of the apparatus.
Figure 7:
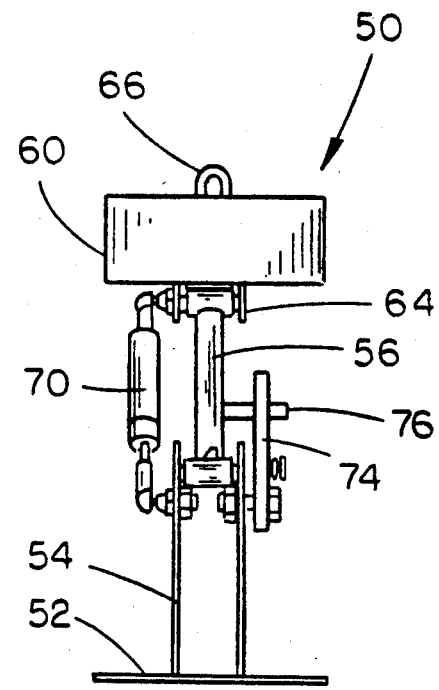
FIG. 7 is a back elevation view of a second embodiment of the self-loading dolly mount apparatus illustrating the components of the apparatus.
Figure 8:
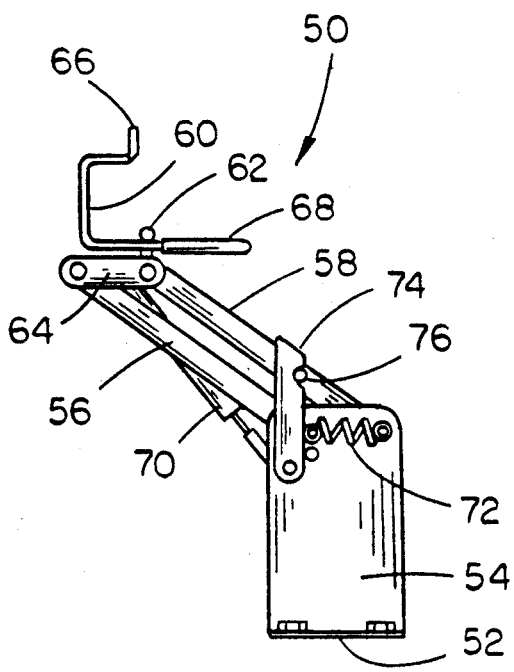
FIG. 8 is a side elevation view of a second embodiment of the self-loading dolly mount apparatus showing the apparatus in a locked storage position.
Figure 9:
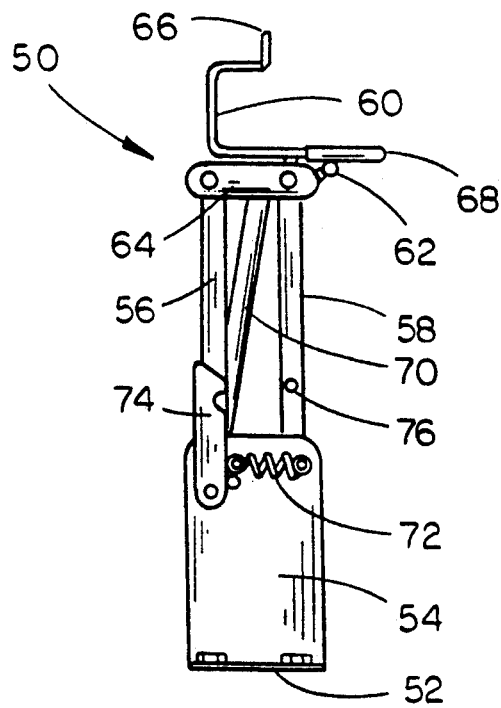
FIG. 9 is a side elevation view of a second embodiment of the self-loading dolly mount apparatus being extended to an unloading or loading position.
Figure 10:
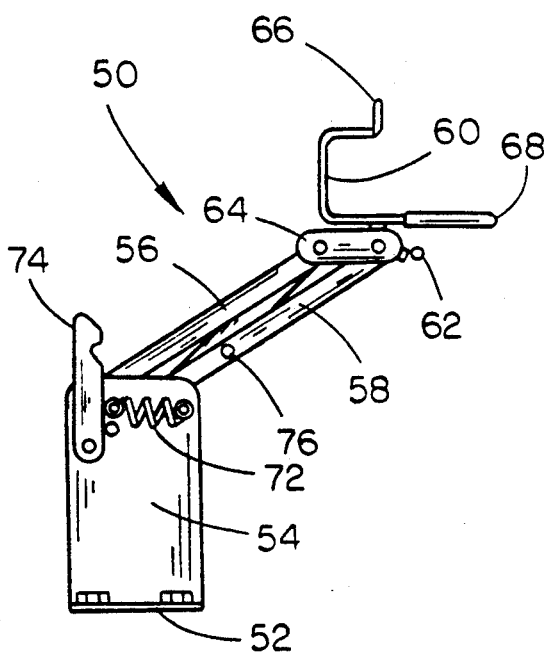
FIG. 10 is a side elevation view of a second embodiment of the self-loading dolly mount apparatus extended to an unloading or loading position.

In a second embodiment 50 of the present invention a towing dolly 90 may be rotated between a storage and loading/unloading position (FIGS. 8, 9, and 10). This embodiment 50 includes a generally U-shaped vertical support stand 54 secured to a tow truck bed 80 by a base 52. A first arm 56 and second arm 58 are pivotally connected, via shackle straps 64, to a dolly mounting bracket 60 having a handle 68 and a chain link 66 (FIGS. 5 and 8).

Also pivotally connected to the stand 54 and dolly mounting bracket is a gas spring 70 (pressurized to approximately 120 psi). In operation, the apparatus 50 is maintained in a storage position (FIG. 5) by the weight of a dolly 90 and a latch 74. Dolly is secured in mounting bracket by a gate assembly 62 which rotates to a locking position preventing the dolly from egressing while the apparatus 50 is in the storage position. To release the dolly 90 from a storage position an operator simply pulls the handle 68 after releasing the latch 74 (held by latch spring 72) from a latch pin 76. The spring 70 facilitates movement to a loading/unloading position (FIG. 10) by lifting the dolly 90 (FIG. 9). At the position illustrated in FIG. 9 the spring 70 is decompressing and the weight of the dolly 90 forces the dolly 90 to the loading/unloading level illustrated in FIG. 10. In this position an operator may safely remove the dolly 90 for towing. Once the dolly 90 is removed the apparatus 50 is pushed back into its storage position as illustrated in FIG. 8.

Thus, it can be seen that at least all of the stated objectives have been achieved.

Obviously, many modifications and variations of the present invention are possible in light of the above teachings. It is therefore to be understood that, within the scope of the appended claims, the invention may be practiced otherwise than as specifically described.

I claim:

1. A self-loading dolly mount apparatus for storing and removably extending a towing dolly, comprising:
   a generally vertical support stand;
   a means for securing said support stand to a bed of a motor vehicle adapted for towing automotive equipment;

a horizontal arm pivotally connected to said support stand and capable of moving from a substantially horizontal loading position to a generally vertical storage position;

a vertical arm pivotally connected to said horizontal arm;

a gas spring, said gas spring having one end thereof pivotally connected to said support stand and the opposing end thereof connected to said vertical arm and having a generally parallel spaced apart relationship to said horizontal arm when said horizontal arm is in said loading position, and said gas spring maintaining said parallel relationship with said horizontal arm as said horizontal arm pivotally moves between said loading and storage positions;

said vertical arm being pivotally movable with respect to said horizontal arm and said gas spring such that said vertical arm attains a position generally parallel to said horizontal arm when said horizontal arm is in the storage position; and means attached to said vertical arm for releasably securing a towing dolly to said vertical arm.

2. The self-loading dolly mount apparatus of claim 1, further comprising a means to releasably latch said horizontal arm and said support stand in a generally fixed relationship when said horizontal arm is in said loading position.

3. The self-loading dolly mount apparatus of claim 2, wherein said latch automatically engages while said gas spring and said vertical arm are maintained in a generally parallel horizontal position.

4. The self-loading dolly mount apparatus of claim 1, further comprising handle means for facilitating operation of said vertical arm.

5. The self-loading dolly mount apparatus of claim 1, further comprising means for limiting pivoting action of said horizontal arm in relation to said support stand.

6. The self-loading dolly mount apparatus of claim 1, further comprising means for pivotally connecting said means for securing a towing dolly to said vertical arm.

* * * * *